United States Patent Office 2,986,584
Patented May 30, 1961

2,986,584

PRODUCTION OF TERPENE ALCOHOLS

Edward H. Sheers, Kew Gardens Hills, N.Y., and Ralph J. Chamberlain, Glenbrook, Conn., assignors to American Cyanamid Company, New York, N.Y., a corporation of Maine No Drawing. Filed Nov. 3, 1958, Ser. No. 771,244

7 Claims. (Cl. 260—631.5)

This invention relates to a method for the production of terpene alcohols from unsaturated cyclic terpene hydrocarbons including compounds closely related to the cyclic terpenes such as diterpenes and polyterpenes. The invention includes a novel method for converting unsaturated cyclic hydrocarbons of this class into alcohols and also certain novel terpene alcohols obtainable thereby, as will hereinafter be more fully described.

Heretofore there has been no general method for converting cyclic terpene hydrocarbons to terpene alcohols. Some of these hydrocarbons can be partially hydrolyzed to dihydric alcohols by reaction with aqueous mineral acids, as in the transformation of 2-pinene or 2(10)-pinene into terpin hydrate. Oxidation with permanganate also produces alcohols in a limited number of cases. It is a principal object of the present invention to provide a method that is of general utility, and which can be applied to any unsaturated cyclic terpene hydrocarbon. A further object is the provision of a method which will produce primary alcohols from unsaturated cyclic terpenes. Further objects of the invention will appear from the following description of preferred embodiments thereof.

The process of our invention is based on the concept of forming a terpenylborane complex by reacting an unsaturated cyclic terpene hydrocarbon with diborane and then decomposing it by hydrolysis and oxidizing to a cyclic terpene alcohol. We have found that this procedure constitutes a method that is applicable to any unsaturated cyclic terpene hydrocarbon, and that it produces good yields of terpene alcohols in most cases.

Although the reaction of diborane with olefin hydrocarbons and subsequent oxidation to produce aliphatic alcohols is known, the same procedure has not heretofore been applied to unsaturated cyclic terpene hydrocarbons. We have found that terpenylborane complexes can be formed and oxidized by our process with little or no disruption or modification of the cyclic terpene molecule; for example, the endo- or exo-bridges of bicyclic terpene hydrocarbons are not broken and therefore the hydroxy derivatives of these terpenes can be obtained directly. This is a very important advantage, since other oxidation or hydrolysis procedures such as those mentioned above frequently change the character of the terpene.

Terpenylborane complexes are readily formed simply by reacting the proper quantity of diborane with an unsaturated cyclic terpene hydrocarbon. The complex contains three molecular equivalents of hydrocarbon combined with one boron atom and therefore ⅙ mol of $B_2H_6$ is needed for each mol of a monounsaturated terpene. Cyclic terpene hydrocarbons containing two double bonds such as the dipentenes and phellandrenes require twice as much diborane and produce dihydric alcohols upon oxidation of their borane complexes. The complexing reaction can be carried out simply by contacting the terpene hydrocarbon with diborane, but preferably an activating solvent is used in order to accelerate the speed of the reaction. Ether-type solvents such as dimethyl ether and particularly diethylene glycol dimethyl ether are preferred; other solvents such as tetrahydrofuran may be used. The reaction is preferably carried out at temperatures up to about 50° C. At higher temperatures there is an undesirable isomerization of the borane-terpene complexes, and lower yields of the desired terpene alcohols are obtained.

Secondary or tertiary terpene alcohols can be obtained by reacting a cyclic terpene hydrocarbon having only ring unsaturation such as 2-pinene with diborane at atmospheric temperature and hydrolyzing and oxidizing the complex at the same temperature. We have found, however, that when such complexes are heated the initial reaction product is transformed into an isomerized terpenyl borane wherein the boron atom is attached at a position adjacent a terminal carbon atom of the terpene hydrocarbon. Subsequent hydrolysis and oxidation then produces a primary alcohol as, for example, 10-hydroxypinane, when the starting material is 2-pinene. If a terpene hydrocarbon having unsaturation adjacent a terminal carbon atom is used, such as 2(10)-pinene, a complex containing boron attached adjacent the terminal carbon atom is obtained directly, and the heating step is unnecessary.

Hydrolysis of the terpenylborane complex is effected simply by mixing with an aqueous alkali such as a dilute solution of sodium or potassium carbonate or bicarbonate or hydroxide. Oxidation of the resulting intermediate to an alcohol is carried out with a mild oxidizing agent such as hydrogen peroxide, oxygen or air. The oxidation is preferably carried out at atmospheric or only slightly elevated temperatures, such as temperatures up to about 50° C., as loss of yield is encountered when higher temperatures are used. The resulting alcohols are preferably recovered by washing the cyclic terpene alcohols with water to remove alkali and residual oxidizing agent followed by drying and distillation at reduced pressures, such as at about 0.5–1 mm. of mercury absolute pressure.

We have applied the above-described process of our invention to a wide variety of unsaturated cyclic terpene hydrocarbons and have found that good yields of terpene alcohols are obtained in all cases. Typical cyclic terpenes that may be used are the pinenes, camphene, carenes such as 3-carene, monocyclic terpene hydrocarbons such as the dipentenes, terpinenes and phellandrenes, and unsaturated bicyclic terpenes of the camphane group such as 2-norbornene. When the process was applied to 1,8-p-menthadiene we obtained 7,10-dihydroxy-p-menthane, which is a new compound included within the scope of our invention. It will be evident that our new process opens a route for the preparation of a number of other novel monohydric and polyhydric terpene alcohols that may be used in the preparation of perfumes, plasticizers and for other purposes in which cyclic terpene alcohols are now employed.

The invention will be further described and illustrated by the following specific examples to which, however, it is not limited.

EXAMPLE 1

Production of 10-hydroxypinane

A solution of 68 grams (0.5 mol) of 2-pinene (alpha-pinene) in diethylene glycol dimethyl ether is maintained at room temperature while a stream of gaseous diborane is introduced. The quantity of $B_2H_6$ theoretically necessary to form a complex is one-twelfth mol or 2.3 grams. After an excess over this amount has been bubbled through, the solution is heated to boiling and refluxed for about 10 to 15 minutes to isomerize the reaction product. It is then hydrolyzed by stirring with 50 cc. of a 10% aqueous sodium carbonate solution and the hydrolyzed product is oxidized by adding about one-half mol of 50% hydrogen peroxide with agitation. When the oxidation is completed the 10-hydroxypinane is recovered by washing with water, drying and vacuum fractionation at about 0.5 mm. of mercury pressure. The yield is 72 grams of a product of good purity.

When 68 grams of 2(10)-pinene (beta-pinene) are substituted for the 2-pinene in the above procedure the same product is obtained in approximately the same yield. The process can therefore be applied to either of these pinenes or to mixtures thereof, such as those obtainable from sulfate turpentine, with equally good results. The 10-hydroxypinane obtained is an intermediate used in the synthesis of odorants.

EXAMPLE 2

Production of 10-hydroxycarane

The diborane reaction can be used to introduce primary hydroxyl groups into bicyclic terpenes having three-membered rings such as those of the carane group. Thus, for example, the procedures of Example 1 can be used to convert 3-carene into 10-hydroxycarane.

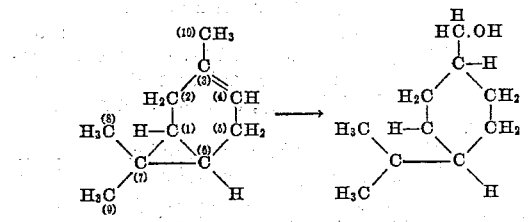

One-half mol of the 3-carene is dissolved in a suitable anhydrous solvent such as the dimethyl ether of diethylene glycol and diborane gas is introduced until the addition complex is formed. This is refluxed for 10 minutes and then hydrolyzed and oxidized with aqueous sodium carbonate solution containing one-half mol of 50% hydrogen peroxide. After washing with water, drying and vacuum fractionation at 0.5 mm. of mercury pressure, the 10-hydroxycarane is obtained in a 95% yield based on the weight of the 3-carene.

EXAMPLE 3

Production of 7,10-dihydroxy-p-menthane

We have found that dihydroxy compounds are obtained when a monocyclic terpene containing two double bonds is substituted for the pinenes used in Example 1. This has enabled us to prepare dihydric alcohols from such terpene hydrocarbons as the dipentenes, limonenes, terpinenes and phellandrenes. Thus 7,10-dihydroxy-p-menthane, a new compound, has been obtained from 1,8-p-menthadiene.

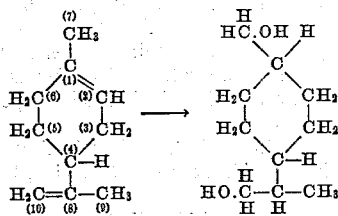

The operating procedure is similar to that of the preceding examples. A measured quantity such as 0.5 ml. (68 grams) of 1,8-p-menthadiene is dissolved in an anhydrous solvent such as the dimethyl ether of diethylene glycol and converted into a borane complex by bubbling an excess over one-sixth (4.6 grams) of diborane through the solution. This complex is isomerized by boiling the solution for about 10 minutes and is then hydrolyzed by stirring with a dilute aqueous solution of sodium or potassium hydroxide or carbonate. It is then oxidized by adding 70 grams of a 50% hydrogen peroxide solution and agitating until the oxidation is complete. The oxidized reaction product is washed with water, dried, and distilled at 0.5 mm. of mercury pressure. The 7,10-dihydroxy-p-menthane distils at 158° C. under this pressure and is obtained as a very viscous colorless liquid in a yield of 83.4 grams.

The same product is obtained in substantially the same yield when 1,3-p-menthadiene, 1,4-p-menthadiene, 1(7),2-p-menthadiene and 1,5-p-menthadiene are substituted for 1,8-p-menthadiene in the above-described procedure.

EXAMPLE 4

Production of 2,2-dimethyl-3-hydroxymethyl-norbornane

The application of the process of the invention to unsaturated terpene hydrocarbons of the bornane (camphane) type is illustrated by the production of the above compound from camphene.

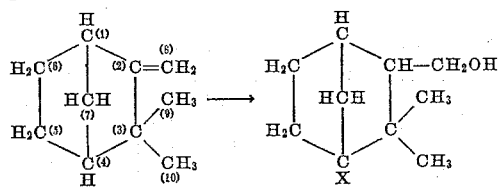

A solution of 68 grams of camphene in 230 grams of diethylene glycol dimethyl ether is held at room temperature while an excess of diborane is introduced. No isomerization is necessary and therefore the cold reaction product is hydrolyzed and oxidized by adding about 200 ml. of an aqueous solution containing 7 grams of sodium carbonate and 35 grams of hydrogen peroxide and agitating until the oxidation is completed. The final product is separated by washing with water, drying and vacuum fractionation.

EXAMPLE 5

Production of 7,7-dimethyl-1-hydroxymethyl-norbornane

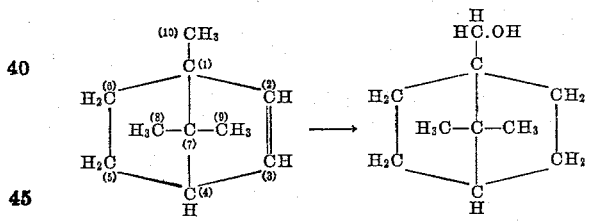

Gaseous diborane is bubbled into a solution of 2-bornene in about three times its weight of diethylene glycol dimethyl ether at room temperature until one-sixth mol of $B_2H_6$ for each mol of the bornylene has been absorbed and the hydroboration is complete. The solution is then heated to boiling and refluxed for about 10–15 minutes to bring about isomerization to the 1,10 position and is then cooled and an excess of aqueous sodium carbonate is added followed by the addition of one mol of hydrogen peroxide for each mol of the 2-bornene, and the solution is agitated to complete the oxidation. It is then washed with water, dried, and the 7,7-dimethyl-1-hydroxy-methyl-norbornane is recovered by distillation at about 0.5 millimeter of mercury.

What we claim is:

1. A method of producing a terpene alcohol which comprises reacting an unsaturated bicyclic terpene hydrocarbon with diborane and thereby forming a terpenyl-borane complex, hydrolyzing and oxidizing said complex by adding an aqueous alkali and a mild oxidant and recovering the cyclic terpene alcohol so obtained.

2. A method of producing a primary terpene alcohol from a bicyclic terpene hydrocarbon having a double bond in a ring thereof which comprises reacting said terpene hydrocarbon with diborane at a temperature below about 50° C. and thereby combining it with boron at the location of said double bond, then heating the reaction product at a temperature above 50° C. and thereby isomerizing it to a complex wherein the boron is attached at a position adjacent a terminal carbon atom of the terpene hydrocarbon, and then hydrolyzing said complex and oxidizing the resulting intermediate to a primary cyclic terpene alcohol by adding an aqueous alkali and a mild oxidant, and recovering the terpene alcohol so produced.

3. A method according to claim 2 in which the hydrocarbon is 2-pinene.

4. A method according to claim 2 in which the hydrocarbon is a carene.

5. A method of producing a primary terpene alcohol from a bicyclic terpene hydrocarbon having a double bond adjacent a terminal carbon atom which comprises reacting said hydrocarbon with diborane at a temperature below about 50° C. and thereby combining it with boron at the location of said double bond and then hydrolyzing said complex and oxidizing the resulting intermediate to a primary cyclic terpene alcohol by adding an aqueous alkali and a mild oxidant, and recovering the terpene alcohol so produced.

6. A method according to claim 5 in which the hydrocarbon is 2(10)-pinene.

7. A method according to claim 5 in which the hydrocarbon is camphene.

References Cited in the file of this patent

UNITED STATES PATENTS 2,738,370    Staib et al. _____ Mar. 13, 1956

OTHER REFERENCES

Brown et al.: "J. Org. Chem.," volume 22, pages 1136–7, September 1957.

UNITED STATES PATENT OFFICE
CERTIFICATION OF CORRECTION

Patent No. 2,986,584　　　　　　　　　　　　　　　May 30, 1961

Edward H. Sheers et al.

It is hereby certified that error appears in the above numbered patent requiring correction and that the said Letters Patent should read as corrected below.

Column 3, lines 23 to 30, the right-hand portion of the formula should appear as shown below instead of as in the patent:

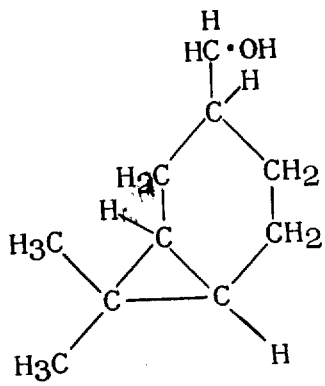

column 4, lines 17 to 24, the right-hand portion of the formula should appear as shown below instead of as in the patent:

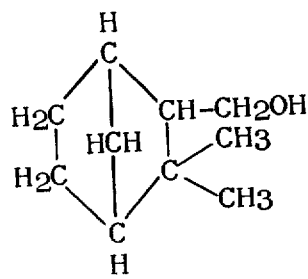

Signed and sealed this 28th day of November 1961.

(SEAL)
Attest:

ERNEST W. SWIDER
Attesting Officer

DAVID L. LADD
Commissioner of Patents